Nov. 2, 1971  H. LOQUENZ ET AL  3,616,613
VENTURI APPARATUS FOR SCRUBBING GAS

Filed Sept. 5, 1968  2 Sheets-Sheet 1

INVENTORS
HEINZ LOQUENZ
HORST WEBER
HELMUT PFISTERER
By Steinberg & Blake
attys

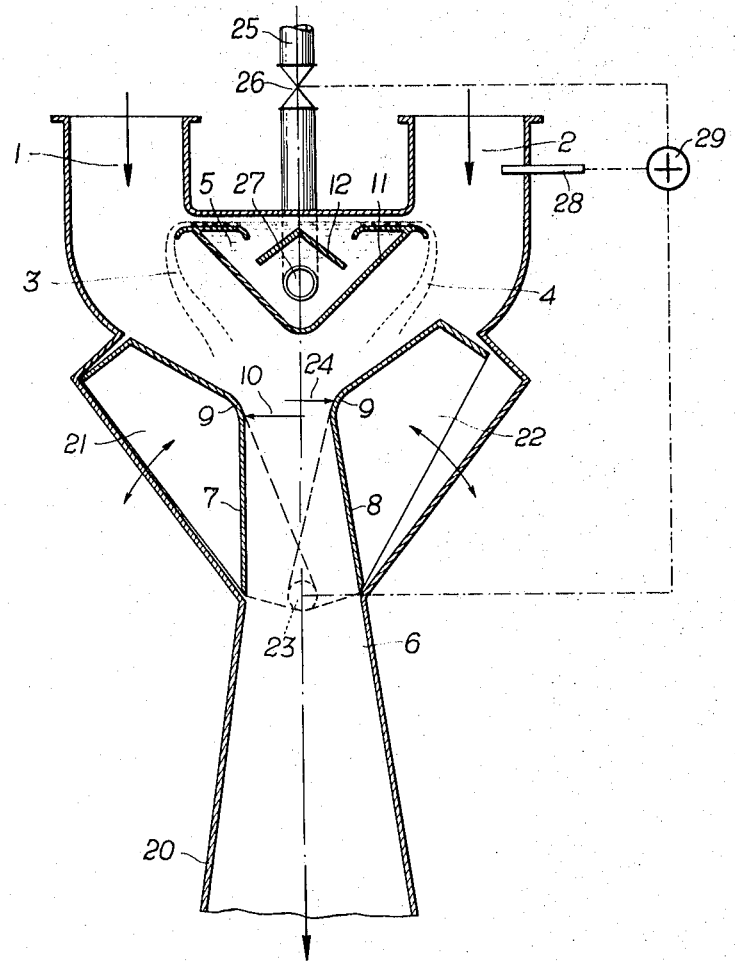

United States Patent Office 3,616,613
Patented Nov. 2, 1971

3,616,613
VENTURI APPARATUS FOR SCRUBBING GAS
Heinz Loquenz and Horst Weber, Vienna, and Helmut
Pfisterer, Kritzendorf, near Vienna, Ausaria, assignors
to Waagner-Biro AG, Vienna, Austria
Filed Sept. 5, 1968, Ser. No. 757,545
Claims priority, application Austria, Sept. 14, 1967,
A 8,422/67
Int. Cl. B01d 47/10
U.S. Cl. 55—227
10 Claims

ABSTRACT OF THE DISCLOSURE

An apparatus for scrubbing a gas such as a crude gas laden with dust particles which are to be removed from the gas stream. The gas which is to be cleaned is directed along the interior of a Venturi, first through a converging portion, then through the throat, and then through the diverging portion or diffusor of the Venturi. Upstream of the Venturi throat a liquid-supply means is located for situating in the path of gas flow a screen of washing liquid which falls by gravity across the gas stream so that the latter by its kinetic energy will break up the screen of washing liquid into fine and very fine droplets which become uniformly distributed across the gas stream to flow with the latter through the Venturi throat and then along the diffusor portion of the Venturi.

BACKGROUND OF THE INVENTION

The present invention relates to an apparatus for scrubbing dust-laden crude gas in a Venturi scrubber.

Different types of Venturi scrubbers are known where the washing liquid is sprayed under pressure into the gas stream. Washing of the gas in this matter has the disadvantages of requiring a large consumption of energy and a large amount of washing liquid. Also, with the known method and apparatus the amount of washing liquid and the size of the cross section of the gas stream are not always adapted to the particular gas through-put.

SUMMARY OF THE INVENTION

It is accordingly a primary object of the invention to provide a gas-scrubbing apparatus which will avoid the above drawbacks.

In particular, it is an object of the present invention to provide a gas-scrubbing apparatus which does not require the washing liquid to be introduced under pressure into the gas stream.

It is also an object of the present invention to provide an apparatus which enable at least the amount of washing liquid supplied or the size of the gas-stream cross section, preferably both, to be automatically adjusted according to the amount of gas through-put.

In accordance with the invention, upon entry of the gas which is to be cleaned into the converging portion of the Venturi means, there is a liquid-supply means which directs across the gas stream a screen of washing liquid which simply falls by gravity across the stream of flowing gas so that the washing liquid is introduced without pressure into the gas stream. At the same time the gas stream, as a result of its kinetic energy, flows through and breaks up the screen of falling washing liquid into fine and very fine droplets which automatically become uniformly distributed across the gas stream to flow with the latter through the Venturi throat and then along the diverging Venturi portion. With this apparatus the liquid droplets are uniformly distributed across the gas stream particularly in the Venturi throat. According to a further feature of the invention, an adjusting means is provided for adjusting the size of the Venturi throat to adapt it to the particular gas through-put. Also, the amount of liquid supplied by the liquid-supply means is adjusted in accordance with the gas through-put in order to achieve the best possible scrubbing results. Thus, with the apparatus of the invention there will be situated upstream of the Venturi throat a liquid-supply means providing a screen of washing liquid which falls by gravity from one wall portion to an opposed wall portion of the Venturi means at the regionn of the converging portion thereof, so that the gas which is to be cleaned will be compelled to flow through the falling screen of washing liquid.

BRIEF DESCRIPTION OF DRAWINGS

The invention is illustrated by way of exampling the accompanying drawings which form part of this application and in which:

FIG. 2 is a longitudinal axial sectional illustration schematically showing another embodiment of a scrubber which makes it possible to adjustt he Venturi throat.

DESCRIPTION OF PREFERRED EMBODIMENTS

Figure 1:
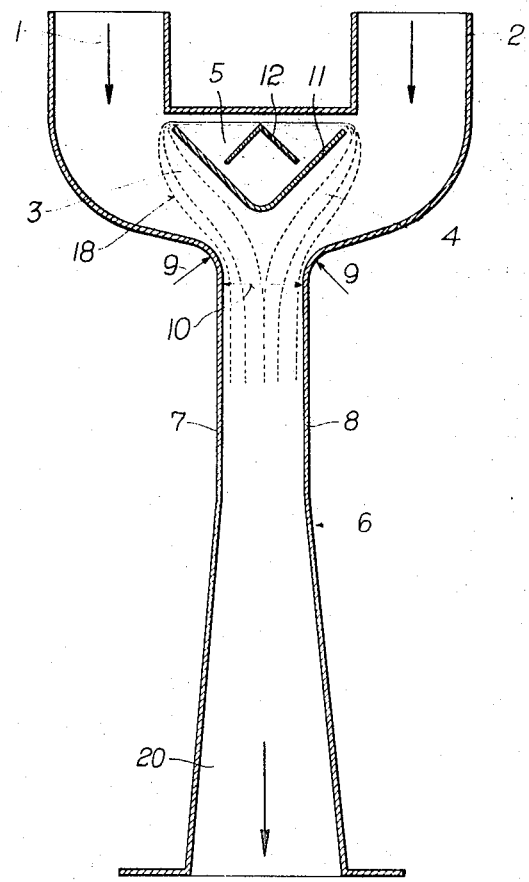
FIG. 1 is a schematic elevation of one embodiment of a scrubber of the invention, FIG. 1 being taken in a sectional plane which includes a longitudinal central axis of the scrubber.

Referring first to FIG. 1, the schematically illustrated Venturi scrubber 6 divides the gas which is to be cleaned into a pair of subsidiary gas streams 1 and 2. A liquid-supply means 5 is provided to direct across the subsidiary streams 1 and 2 a pair of screens 3 and 4 of washing liquid so that the streams 1 and 2 must flow through the screens of washing liquid 3 and 4. For this purpose the supply means 5 includes a liquid-distributing trough 11 extending across the converging portion of the Venturi and having a pair of opposed overflow edges over which the washing liquid flows to fall by gravity from one wall portion to an opposed wall portion of the Venturi means, so that in this way the gas which is to be cleaned is directed into engagement with a washing liquid which has only a force resulting from the gravitational falling of the liquid.

As a result of the kinetic energy of the flowing gas streams, the screens of washing liquid are broken up into fine and extremely fine droplets which, also as a result of the kinetic energy of the flowing gas stream, become uniformly distributed across the stream of gas and particularly at the throat 10 where the Venturi means has its smallest cross section. The particular Venturi means illustrated is of rectangular configuration in cross section, and the Venturi throat is defined between the parallel walls 7 and 8. Downstream of the Venturi throat, the Venturi means includes the diverging portion which provides the diffusor 20, and upstream of the Venturi throat the Venturi means has the conduits in which the subsidiary streams 1 and 2 respectively flow, these conduits joining each other where the liquid-supply means 5 is located to form the converging portion of the Venturi which leads to the throat 10 thereof.

Just upstream of the Venturi throat 10, at the junction between the converging portion of the Venturi and its throat, the Venturi means has curved portions provided with radii of curvature 9 which are approximately equal to and preferably are somewhat greater than 0.15 time the width of the narrowest part of the Venturi, which is to say the width of the throat 10 thereof.

In order to avoid formation of a star-shaped body of washing liquid in the region of the Venturi axis, the liquid-supply means 5 is preferably situated at the location where the gas streams 1 and 2 initially change their direction of flow or begin to change their cross sections, at the converging portion of the Venturi means. In order to assure a symmetrical contact between the gas and washing liquid and a symmetrical supply of washing liquid, the trough 11 of the liquid-supply means 5 has, in advance of the overflow edges thereof, a damping baffle means 12 which extends across the Venturi duct so as to prevent vibrations which otherwise would occur in the gas column.

Of course, within the scope of the invention there are further possible structures such as a structure where a single pipe supplies the gas to the throat of the Venturi or where more than a pair of subsidiary gas streams are provided. In the case where a single gas-supply duct is provided, the outer walls of the ducts through which the streams 1 and 2 flow in FIG. 1 can simply form part of a single common duct surrounding the Venturi axis with the liquid-supply means 5 extending centrally across the larger single duct for the gas and forming part of a unit which replaces a section of the gas-supply duct.

The embodiment of the invention which is illustrated in FIG. 2 is substantially identical with that of FIG. 1, the primary difference being that this embodiment is provided with an adjusting means for adjusting the cross section of the Venturi throat. Thus, those parts of FIG. 2 which correspond to those of FIG. 1 are indicated with the same reference characters.

However, with the embodiment of FIG. 2 the opposed side walls 7 and 8 are fixed at one or both ends to swingable plates 21 and 22, respectively, which are swingable about a common pivot axis 23 which extends perpendicularly across the Venturi axis in a direction normal to the plane of FIG. 2.

For purposes of illustration, the left plate 21 of FIG. 2 is shown in its normal position determining the narrowest Venturi cross section at the throat 10, while the right plate 22 is illustrated swung to a location corresponding to a partial-load position and providing the Venturi throat with a reduced cross section 24. Of course, it is to be understood that in the actual construction the walls 7 and 8 will be simultaneously swung equally and oppositely by a suitable drive connected to the plates 21 and 22 and turning them simultaneously through equal and opposite angles about the common pivot axis 23.

In order to achieve the best possible dust removal with the least-expensive means, not only is an adjusting means as described above and shown in FIG. 2 provided for adjusting the narrowest cross section of the Venturi means, but in addition an adjusting means is provided for adjusting the amount of liquid supplied by the liquid-supply means 5, so that in this way it is possible to adapt not only the size of the Venturi throat but also the amount of liquid supplied in accordance with the particular gas through-put which prevails during a given operation.

In FIG. 2, the liquid-supply means 5 receives the washing liquid through a supply pipe 25 provided with an adjusting valve 26, the liquid flowing from the pipe 25 downstream of the valve 26 into a distributing pipe 27 such as a suitably perforated length of pipe extending longitudinally along the interior of the trough 11 to deliver the washing liquid to the interior thereof. Thus, the adjustable valve 26 provides an adjusting means capable of adjusting the amount of liquid supplied in accordance with the particular gas through-put. This adjustment can be automatically achieved by providing a means for measuring the gas through-put and for actuating the adjusting means 26 in accordance with the amount of gas through-put which is measured. Thus, a gas-amount measuring means 28, in the form of a Pitot tube, for example, is built into the Venturi means at the region where the gas is directed toward the converging portion of the Venturi means, and this measuring means 28 will, through an impulse transmiter 29, control a drive which is operatively connected with the plates 21 and 22 for turning them simultaneously equally and oppositely about the pivot axis 23, this measuring means 28 simultaneously actuating the adjusting means 26 also in a fully automatic manner, so that both the amount of liquid which is supplied and the size of the Venturi throat are automatically adjusted according to the gas through-put. For example, the impulse transmitter 29 can, through suitable known servo mechanisms, adjust the valve 26 and adjust the angular positions of the plates 21 and 22 and thus of the opposed Venturi walls 7 and 8. For this latter purpose, for example, the plates 21 and 22 can have a pair of racks pivotally connected thereto and respectively engaging opposed peripheral portions of a gear which is turned by the servo mechanism so that in this way the plates 21 and 22 will be equally and oppositely turned about the axis 23.

Figure 3:
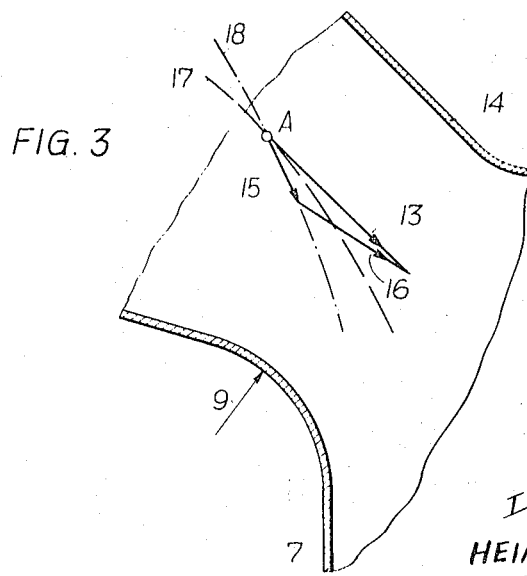
FIG. 3 is a diagrammatic representation of the speed relationships at locations where the dust particles pf the gas encounter droplets of the washing liquid.

FIG. 3 diagrammatically illustrates the speed relationships for the dust particles and liquid droplets at the location where the gas stream contacts the droplets of washing liquid. The gas flows with a speed component 13 into the inlet portion 14 of the scrubber. The speed 13 depends on the one hand upon the amount of gas and on the other hand can be influenced by the selection of the size of the cross section of the stream. The speed component 15 of the droplets of washing liquid is determined by the speed with which the droplets fall and the accelerating or decelerating action of the gas stream. As has been indicated above, the falling screen of washing liquid which flows over the edge of the trough of the liquid-supply means is broken up by the kinetic energy of the gas into fine and extremely fine droplets, and these droplets are uniformly distributed throughout the cross section of the gas stream, so that in this way the outstanding, particularly effective cleaning action of the method and apparatus of the invention is achieved.

In the vector diagram of FIG. 3, there is between the vector 13 of the gas speed component, at the point A of the gas flow path 17, and the speed component 15 of the droplet of washing liquid, which moves along the path 18, a relative speed component 16. Tests have shown that with an increase in the magnitude of the relative speed component 16, there is also an increase in the extent of impurities washed out of the gas by the scrubber.

The invention of course is not limited to the particular details of FIGS. 1 and 2. The particular scrubber illustrated therein preferably has a Venturi means of rectangular cross section, but the principles of the invention are also applicable to other cross sections such as Venturi ducts of circular cross section. Furthermore, it is possible to construct the scrubber of the invention from a plurality of structures as shown in the drawings interconnected either beside each other in a parallel arrangement or one subsequent to the other in a series arrangement. The change in the size of the Venturi throat can be achieved not only by the illustrated tiltable walls but also by other means such as, for example, through eccentric bodies.

What is claimed is:

1. In a gas scrubber, elongated hollow Venturi means having a throat, converging and diverging portions respectively situated upstream and downstream of and communicating with said throat, and a pair of conduits symmetrically arranged with respect to said throat and leading into said converging portion so that a gas which is to be cleaned can be directed through said Venturi means first along said conduits into said converging portion, then through said throat, and finally through said diverging portion thereof, and liquid-supply means, situated upstream of said Venturi throat at the region of said converging portion of said Venturi means, said liquid-supply means including a trough symmetrically situated with respect to said Venturi throat and having a pair of overflow edges over which liquid filling said trough spills to fall by gravity into streams of gas flowing along said conduits into said converging portion for directing across the interior of said Venturi means screens of washing liquid which fall by gravity, which have only a force resulting from gravitational falling of the liquid and through which the gas to be cleaned is compelled to flow so that through the kinetic energy of the gas the falling screen of washing liquid is broken up into fine and very fine droplets which become uniformly distributed across the gas and flow with the latter through the throat and along the diverging portion of the Venturi means.

2. The combination of claim 1 and wherein an adjusting means is operatively connected with said Venturi means for adjusting the size of the throat thereof.

3. The combination of claim 1 and wherein an adjusting means is operatively connected with said liquid-supply means for adjusting the amount of liquid supplied thereby.

4. The combination of claim 1 and wherein a pair of adjusting means are operatively connected respectively with said liquid-supply means and said Venturi means for adjusting the amount of liquid supplied by said liquid-supply means and for adjusting the size of the throat of said Venturi means, and actuating means for responding to the amount of gas through-put and operatively connected with at least one of said adjusting means for automatically adjusting the latter according to the gas through-put.

5. The combination of claim 1 and wherein said Venturi means includes a duct of rectangular cross section which provides for the gas stream a cross section of rectangular configuration.

6. The combination of claim 1 and wherein said Venturi means includes at its throat adjustable walls movable for adjusting the size of the throat.

7. The combination of claim 6 and wherein said adjustable walls include portions turnable about a given axis.

8. The combination of claim 1 and wherein said Venturi means has just upstream of the throat thereof at the junction between the converging portion of said Venturi means and the throat thereof a portion having a radius of curvature approximately equal to 0.15 times the width of the throat of said Venturi means.

9. The combination of claim 1 and wherein a damping baffle means is situated in said trough in advance of said overflow edges for eliminating vibrations of the gas stream in said Venturi means.

10. The combination of claim 1 and wherein a pair of adjusting means are respectively operatively connected with said liquid-supply means for adjusting the amount of liquid supplied thereby and with said Venturi means for adjusting the size of the throat thereof, and measuring means situated in the path of gas flow for measuring the amount of gas through-put, said measuring means being operatively connected with said pair of adjusting means for actuating the latter to bring about automatically adjustment of the amount of washing liquid and the size of the throat of said Venturi means in accordance with the amount of gas through-put measured by said measuring means.

References Cited

UNITED STATES PATENTS

| | | | |
|---|---|---|---|
| 2,214,880 | 9/1940 | Crawford | 55—228 X |
| 2,871,973 | 2/1959 | Roudob | 55—228 |
| 3,131,237 | 4/1964 | Collins, Jr. | 55—222 X |
| 3,212,235 | 10/1965 | Markant | 55—89 X |
| 3,339,344 | 9/1967 | Pallinger | 55—90 |
| 3,494,099 | 2/1970 | Eng et al. | 55—223 X |

FOREIGN PATENTS

| | | | |
|---|---|---|---|
| 535,484 | 4/1941 | Great Britain | 55—228 |

REUBEN FRIEDMAN, Primary Examiner

C. N. HART, Assistant Examiner

U.S. Cl. X.R.

261—51, Dig. 54